US012485456B2

(12) United States Patent
Barnes et al.

(10) Patent No.: US 12,485,456 B2
(45) Date of Patent: Dec. 2, 2025

(54) ARC TURNTABLE CLEANER

(71) Applicant: STONEAGE, INC., Durango, CO (US)

(72) Inventors: Jeffery R. Barnes, Ignacio, CO (US); Gerald P. Zink, Durango, CO (US); Johannes Bouwe van der Wal, Aldeboarn (NL)

(73) Assignee: STONEAGE, INC., Durango, CO (US)

( * ) Notice: Subject to any disclaimer, the term of this patent is extended or adjusted under 35 U.S.C. 154(b) by 26 days.

(21) Appl. No.: 18/667,870

(22) Filed: May 17, 2024

(65) Prior Publication Data

US 2025/0345828 A1 Nov. 13, 2025

Related U.S. Application Data

(60) Provisional application No. 63/644,956, filed on May 9, 2024.

(51) Int. Cl.
*B08B 3/02* (2006.01)

(52) U.S. Cl.
CPC .............. *B08B 3/024* (2013.01); *B08B 3/022* (2013.01)

(58) Field of Classification Search
CPC ................................ B08B 3/024; B08B 3/022
See application file for complete search history.

(56) References Cited

U.S. PATENT DOCUMENTS

| | | | | |
|---|---|---|---|---|
| 3,543,774 | A * | 12/1970 | Trasp | B60S 3/04 134/123 |
| 4,744,379 | A | 5/1988 | Goettel | |
| 5,482,066 | A | 1/1996 | Krueger | |
| 9,950,348 | B2 | 4/2018 | Zink | |
| 11,987,944 | B2 * | 5/2024 | Knapp | B08B 3/041 |
| 2016/0199870 | A1 * | 7/2016 | Wright | B08B 9/0936 248/558 |
| 2017/0157636 | A1 * | 6/2017 | Wright | F16M 11/24 |
| 2017/0219304 | A1 * | 8/2017 | Mathis | F16L 3/223 |
| 2022/0057151 | A1 * | 2/2022 | Hastey | F28G 15/02 |
| 2022/0290932 | A1 * | 9/2022 | Barnes | B08B 9/0433 |

* cited by examiner

*Primary Examiner* — Sharidan Carrillo
(74) *Attorney, Agent, or Firm* — Sand, Sebolt & Wernow Co., LPA

(57) ABSTRACT

The disclosed principles provide embodiments of a novel part cleaning system, and related methods of use and manufacturing, capable of cleaning parts having any nontraditional shapes. An exemplary parts cleaning system provides at least five axes of movement, and comprises a drive rail comprised of a plurality of connectable modular sections, a base configured to support the drive rail, and a cleaning arm and nozzle. The system includes base drive assemblies translating the drive rail across the base, a powered carriage driving on the drive rail, and a feed assembly moving the cleaning arm towards and away from the turntable. The system includes a rotational assembly on the carriage and carrying the feed assembly to rotate the feed assembly and the cleaning arm. A turntable is mounted on the base and sized to carry a part to be cleaned, where the turntable bidirectionally rotates the part along a fifth axis of movement.

11 Claims, 12 Drawing Sheets

ARC TURNTABLE CLEANER

PRIORITY CLAIM

The present disclosure claims priority to U.S. provisional patent application Ser. No. 63/644,956, filed May 9, 2024, which is incorporated herein by reference in its entirety for all purposes.

TECHNICAL FIELD

The present disclosure is generally related to the field of high pressure fluid cleaning systems, and more particularly to a novel parts cleaning system having an arc-shaped track, and movable cleaning arm, and a rotatable turntable, as well as methods of use and methods of manufacture thereof.

BACKGROUND

The cleaning of mechanical parts is a critical function across numerous industries, including automotive repair, manufacturing, and oil and gas production. The dirtier an environment parts and components operate in, the more contaminants they are exposed to and can accumulate. Contaminants such as dirt, rust, and corrosion can accumulate on parts, hindering their performance and lifespan. Process equipment can also become contaminated with product residue and scale or material accumulation from heating or cooling media. Parts washers and high-pressure water cleaners are used to remove these contaminants and restore parts to a clean condition.

Older parts washers have relied on solvents, such as mineral spirits or chlorinated hydrocarbons, to remove contaminants. These solvent-based parts washers are highly effective at cleaning a wide variety of parts and materials. However, many solvents used in parts washers are hazardous to human health and can cause skin irritation, respiratory problems, and even cancer with prolonged exposure. Additionally, these solvents are flammable and pose a fire risk. Solvent-based parts washers can also contribute to air and water pollution if not disposed of properly. Even aqueous parts washers, which were developed in response to the environmental and safety concerns associated with solvent-based parts washers are not typically as effective at cleaning certain types of contaminants, such as heavy grease or oil.

A key limitation of conventional parts washers is also the lack of ability to reach and clean every area of unusually shaped parts. Thus, even if a parts washer employs a solvent or effluent that can sufficiently clean most contaminants, parts that are oddly or uniquely shaped may have hard to reach nooks, cervices, and other areas that are simply not reachable by spray-based parts cleaner. Even more modern aqueous parts cleaners having rotary turntables for the parts cannot sufficiently maneuver a part having difficult to reach areas hiding contaminants. Ultrasonic cleaners are another type of parts cleaner that use high-frequency sound waves to create cavitation in a cleaning solution. The cavitation bubbles can dislodge contaminants from the surface of parts, even in hard-to-reach areas, and thus can be effective at cleaning delicate parts and parts with complex geometries. However, they are typically more expensive than traditional aqueous parts washers and may not be suitable for cleaning all types of parts or contaminants.

Despite the advancements in parts washing technology, there remains a need for parts washers that are safe, effective, environmentally friendly, and cost-efficient, but that can be employed for cleaning parts of all unique and odd shapes and sizes without the risk of missing hard to reach areas of the parts. The disclosed principles provide for such a novel part cleaning system, and related methods of use and manufacturing, capable of cleaning parts having any non-traditional shapes, and that does not suffer from the deficiencies of conventional cleaning systems.

SUMMARY

The disclosed principles provide embodiments of a novel part cleaning system, and related methods of use and manufacturing, capable of cleaning parts having any nontraditional shapes, and that does not suffer from the deficiencies of conventional cleaning systems. In one exemplary embodiment, a parts cleaning system designed and constructed in accordance with the disclosed principles comprises a drive rail comprised of a plurality of connectable modular sections, each section having either a straight or curved shape, where the drive rail starts at a first end and ends at a second end. An exemplary embodiment may also include a base configured to support the first and second ends of the drive rail, and a cleaning arm having a cleaning nozzle mounted at one end, wherein the nozzle comprises one or more fluid openings. The cleaning system may further include first and second powered base drive assemblies coupled to the first and second ends, respectively, of the drive rail, where the base drive assemblies together bidirectionally translate the drive rail across the base along a first axis of movement. The exemplary cleaning system may further include a powered carriage mounted to and driving bidirectionally on the drive rail along a second axis of movement, and a powered feed assembly moving the cleaning arm towards and away from the turntable along a third axis of movement. Still further, the exemplary embodiment can include a powered rotational assembly mounted on the powered carriage and carrying the feed assembly, wherein the rotational assembly bidirectionally rotates the feed assembly and the cleaning arm along a fourth axis of movement. A powered turntable mounted on the base and sized to carry a part to be cleaned may also be included in the cleaning system, where the turntable bidirectionally rotates the part along a fifth axis of movement.

In other aspects, methods of cleaning uniquely shaped parts and methods of manufacturing cleaning systems are also disclosed. In one embodiment of a method of cleaning a part may comprise forming a drive rail comprised of a plurality of connectable modular sections, each section having either a straight or curved shape, where the drive rail starts at a first end and ends at a second end, and the first and second ends are supported on a base. Such an exemplary method of cleaning a part may further comprise bidirectionally translating the drive rail across the base along a first axis of movement, and bidirectionally driving a carriage on the drive rail along a second axis of movement. Exemplary methods may further include moving a cleaning arm having a cleaning nozzle at one end towards and away from a part to be cleaned along a third axis of movement, wherein the cleaning arm is mounted on the carriage translating the drive rail. Such methods may also include bidirectionally rotating the cleaning arm along a fourth axis of movement, bidirectionally rotating the part to be cleaned along a fifth axis of movement using a turntable mounted on the base, and then expelling effluent from the nozzle onto the part to be cleaned.

Additional embodiments and advantages and variation thereof are also encompassed within the scope of the disclosed principles, and some such exemplary embodiments discussed in further detail herein.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawing, in which:

DETAILED DESCRIPTION

Figure 1:
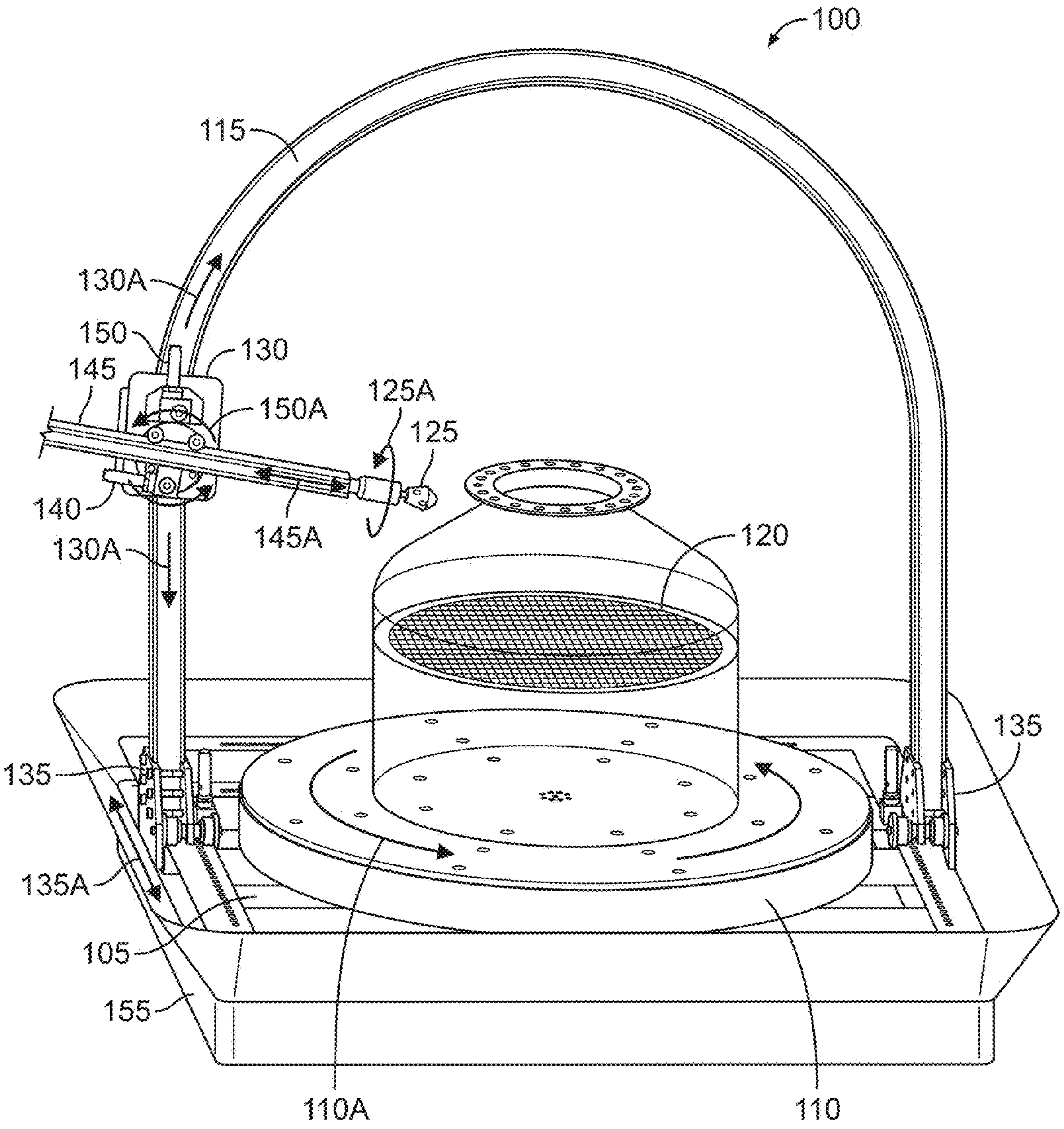
FIG. 1 illustrates an isometric view of one embodiment of arc-based turntable cleaning station designed and constructed in accordance with the disclosed principles.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Although multiple embodiments are shown and discussed in great detail, it will be apparent to those skilled in the relevant art that some features that are not relevant to the present invention may not be shown for the sake of clarity.

Turning initially to FIG. 1, illustrated is an isometric view of one embodiment of arc-based turntable cleaning station/system 100 designed and constructed in accordance with the disclosed principles. In this embodiment, the cleaning station or system 100 includes a base 105 which holds a rotating turntable 110 (rotatable bidirectionally along arrows 110A), as well as a drive rail 115, which in some embodiments has at least a portion has an arc-shape, and is coupled to the base 105 on both ends. In other embodiments, the drive rail 115 may not have any arced portions, and instead may simply have a drive rail with a linear or rectilinear geometry. In yet other embodiments, the drive rail could be configured as a first vertical or angled rail with horizontal or otherwise non-vertical support to an opposite second vertical or angled rail. The unique cleaning system 100 is designed and configured to clean uniquely and unusually shaped parts, such as the exemplary heat exchanger 120 illustrated on the turntable 110 of the cleaning system 100.

The heat exchanger 120 is uniquely difficult to clean for a conventional parts cleaner because it comprises shapes that are not fully accessible by the spray of nozzles of such conventional parts cleaners. For example, as conventional parts cleaners have stationary nozzles, which thus necessarily have a static spray path for each nozzle, even the rotation of the part within the parts cleaner may not be sufficient to reach all areas needing cleaning with the nozzle sprays. Thus, a parts cleaner, such as one in accordance with the disclosed principles, may require movement of the spray nozzle(s) in order to reach such difficult-to-access locations. The exemplary cleaning system 100 of FIG. 1 has such ability to reach difficult-to-access locations of an oddly-shaped part due to the unique movement capabilities of its cleaning nozzle 125. While the cleaning nozzle 125 itself may provide a single or multiple jets, its ability to reach virtually any location on the exterior of a part is provided via its (at least) 4-axis movement combined with the rotational axis of the turntable 110.

This 4-axis movement is provided by a carriage 130 configured to move bidirectionally along a Y-axis (illustrated by arrows 130A) along the drive rail 115. The entire drive rail 115 and carriage 130 can translate bidirectionally along an X-axis (illustrated by arrow 135A) using a pair of base drive assemblies 135 located at where opposing ends of the drive rail 115 are moveably coupled to the base 105 via the base drive assemblies 135. Additionally, bidirectional movement along a Z-axis (illustrated by arrow 145A), which moves the nozzle 125 closer and farther from the part 120, is provided by a feed assembly 140 mounted on the carriage 130. The feed assembly 140 is configured to move the nozzle 125 via a cleaning arm 145, where the nozzle 125 is mounted on its proximal end. Further, a bidirectional rotational pitch axis (illustrated by arrow 150A) for the cleaning arm 145, and thus the nozzle 125, is provided via a rotation assembly 150 also mounted on the carriage 130. By mounting the feed assembly 140 and rotation assembly 150 on the carriage 130, both the Z-axis and pitch axis movement of the arm 145 (and nozzle 125) are provided at any location along the drive rail 115 provided by the carriage 130. A fifth axis is provided by the rotatable turntable 110 (and at variable speeds), while an optional sixth axis (illustrated by arrows 125A) comprising the bidirectional roll rotation of the nozzle 125 about the longitudinal axis of the cleaning arm 145 may also be provided, if desired.

Illustrated surrounding and encompassing the base 105 and turntable 110 is an optional tub or basin 155. The basin 155 may be included to capture cleaning fluid being sprayed from the nozzle 125 to clean the part 120. Such collected fluid can be recycled for reuse by the cleaning system 100 or may be collected for proper disposal. If recycled, the fluid collected with the basin 155 may first be processed through a filtering system (not illustrated) such that the recycled fluid does not inadvertently clog the fluid passages of the nozzle 125. The basin 155 may be comprised of a lightweight material, such as aluminum or plastic, with the base 105 set within the basin 155, or it may be comprised of a heavy material, such as steel, and permanently affixed to the base 105 as part of the cleaning system 100. Additionally, the basin 155 may be formed of various heights, which may be dependent on the size and/or shape of the part 120 being cleaned by the cleaning system 100.

Figure 2:
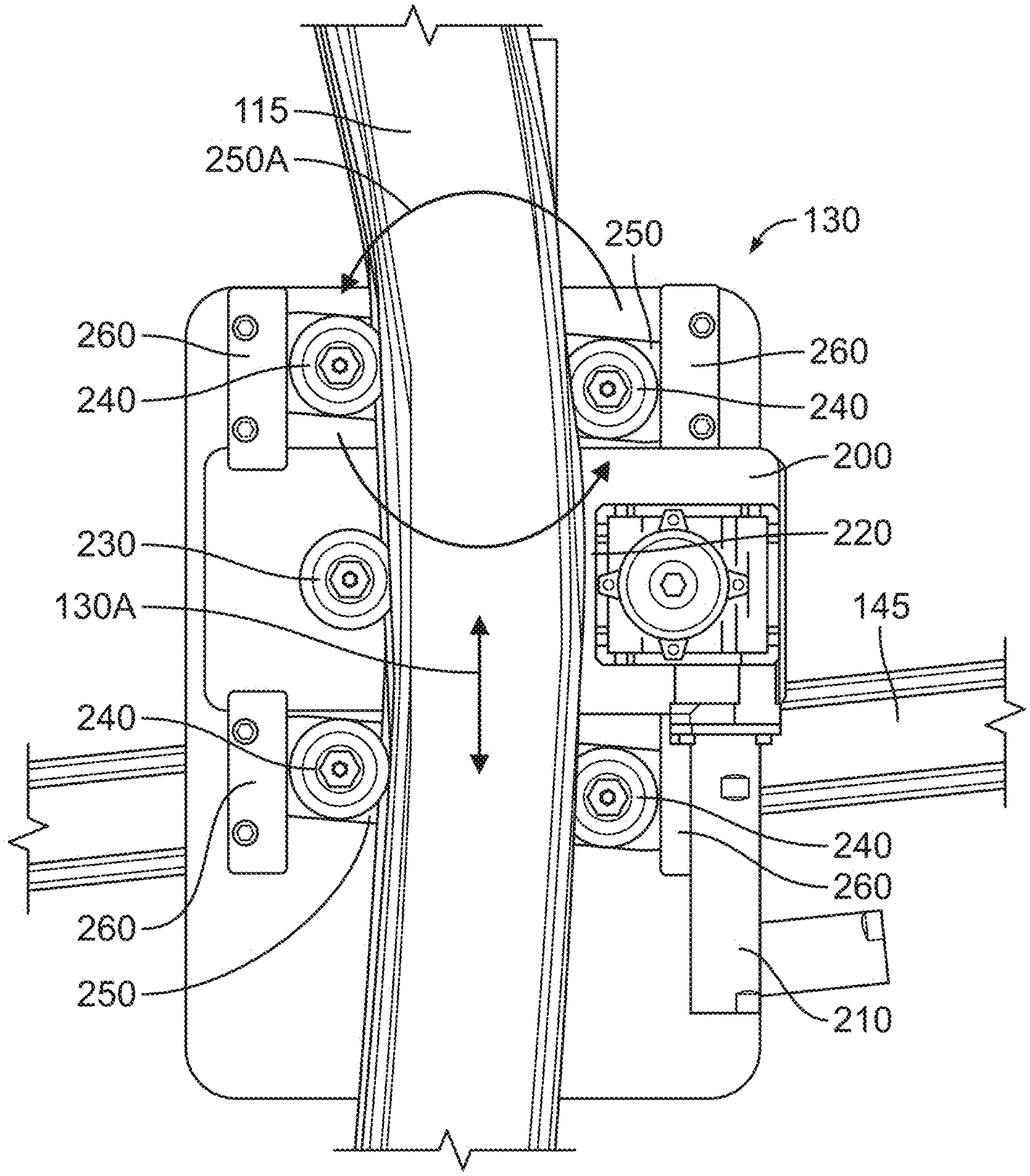
FIG. 2 illustrates an exemplary embodiment of the carriage of the cleaning system illustrated in FIG. 1.

Turning now to FIG. 2, illustrated is an exemplary embodiment of the carriage 130 illustrated in FIG. 1. FIG. 2 illustrates a drive unit 200 that is mounted on a first side of the carriage 130 for moving the carriage 130 along the drive rail 115 in either direction. The drive unit 200 includes a motor 210, which may be an electric or pneumatic motor, coupled to a gearbox in order to turn a drive gear 220. The drive gear 220 has a surface or teeth that runs on the drive rail 115 to translate the carriage along the drive rail 115.

An opposing tensioner roller 230 also runs along the drive rail 115 on the opposite side as the drive gear 220. The tensioner roller 230 allows the carriage 130 to translate along the drive rail 115 and maintain correct gear engagement with corresponding notches 115A or tracks on the drive rail 115 (see FIG. 3) as the carriage 130 travels on both straight and curved drive rail portions and transition between the two. In some embodiments, the tensioner roller 230 is spring loaded such that is continuously provides a grasping force pulling the drive gear 220 against the drive rail 115 so that no slippage can occur. In other embodiments, the tensioner roller 230 is slidably adjustable such that a user can loosen its position relative to the drive rail 115, slide it to a desired position that secures the carriage 130 on the drive rail 115, and then retighten the tensioner roller 230 to the plate of the carriage 130.

Also illustrated in FIG. 2 is a plurality of idler rollers 240. The idler rollers 240 are mounted in pairs on opposing sides of the drive rail 115. Each pair of idler rollers 240 are positioned at a fixed center distance to a respective plate 250 that is free to rotate (along arrows 250A) allowing the idler rollers 240 to maintain full drive rail 115 engagement while the carriage 130 is traveling along straight or curved sections of the drive rail 115, as well as transitions therebetween. A pair of brackets 260 may be affixed to the carriage plate to moveably retain opposing ends of each plate 250 carrying the idler rollers 240. An alternative design for the idler rollers 240 could be to use rigidly secured idlers rollers 240 mounted directly to the carriage plate with a slight clearance gap between each of the rollers 240 and the drive rail 115.

Figure 3:
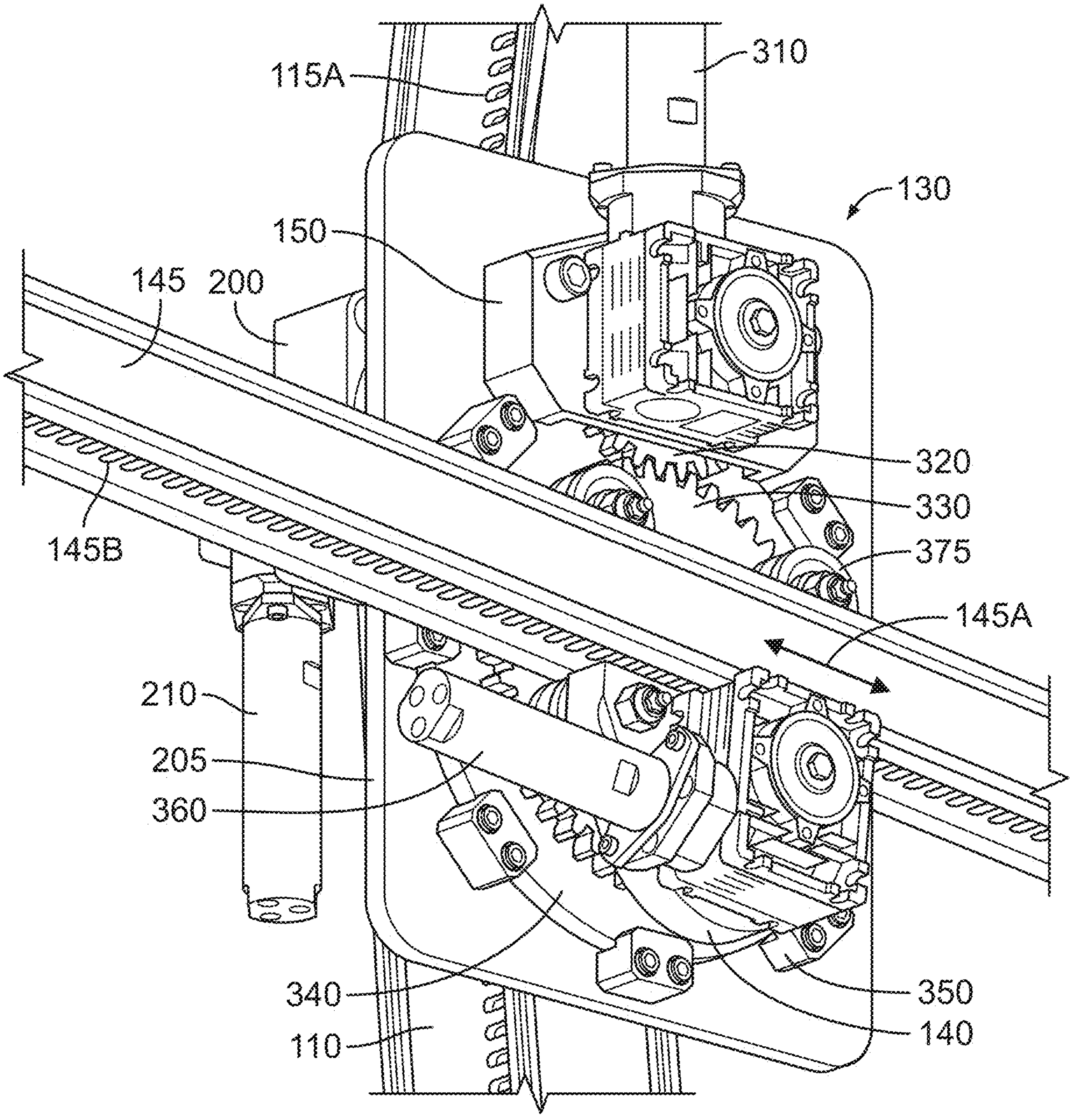
FIG. 3 illustrates a close-up view of the rotation assembly of the cleaning system introduced in FIG. 1.

Looking now at FIG. 3, illustrated is a close-up view of the rotation assembly 150 introduced in FIG. 1. The rotation assembly 150 is mounted to a second side of the carriage 130, opposite to its first side where the drive unit 200 is mounted, to rotate the cleaning arm 145 along arrows 150A. To provide this rotation, the rotation assembly 150 comprises a motor 310 configured to drive, for example through a gearbox, a drive gear 320. The drive gear 320 engages and thereby turns a rotational gear 330 affixed to the cleaning arm 145. The rotational gear 320 may be mounted on a rotational disc 340, which is rotatably retained to the second side of the carriage 130 plate using a sleeve bearing, which is held by brackets 350. The plurality of brackets 350 loosely retain the disc 340 such that it may rotate along arrows 150A when the rotational gear 330 is rotated by the drive gear 320. In some embodiments, rollers or bearings may be included on the interior of one or more of the brackets 350 to aid the rotation of plate 340. Alternatively, a material with a low coefficient of friction may be included on the interior of the brackets 350, such as Teflon® or other similar material. In still other embodiments, all or a portion of the brackets 350 may be formed from oil-impregnated brass, bronze, or other metal to aid in this movements.

Also shown in FIG. 3 is the feed assembly 140, which moves the nozzle 125 mounted on the proximal end of the cleaning arm 145 along arrow 145A towards and away from the part 120 being cleaned. To provide this in and out movement towards and away from the part 120, the feed assembly 140 comprises a motor 360 configured to drive, for example, through a gearbox, a feed gear 370 (not visible in FIG. 3). The feed gear 370 engages notches or slots 145B formed in or on the cleaning arm 145 and thereby translates the cleaning arm 145 along the Z-axis. Also, the feed assembly 140 is mounted to the rotational gear 330 and/or the plate 340 such that as the rotation assembly 150 rotates the cleaning arm 145, the feed assembly 140 is rotated with it. A pair of idler rollers 375 are also provided on an opposing side of the cleaning arm 145 from the feed assembly 140 to retain the cleaning arm 145 against the feed assembly 140 such that no slippage between the feed gear and the cleaning arm 145 occurs.

Figure 4:
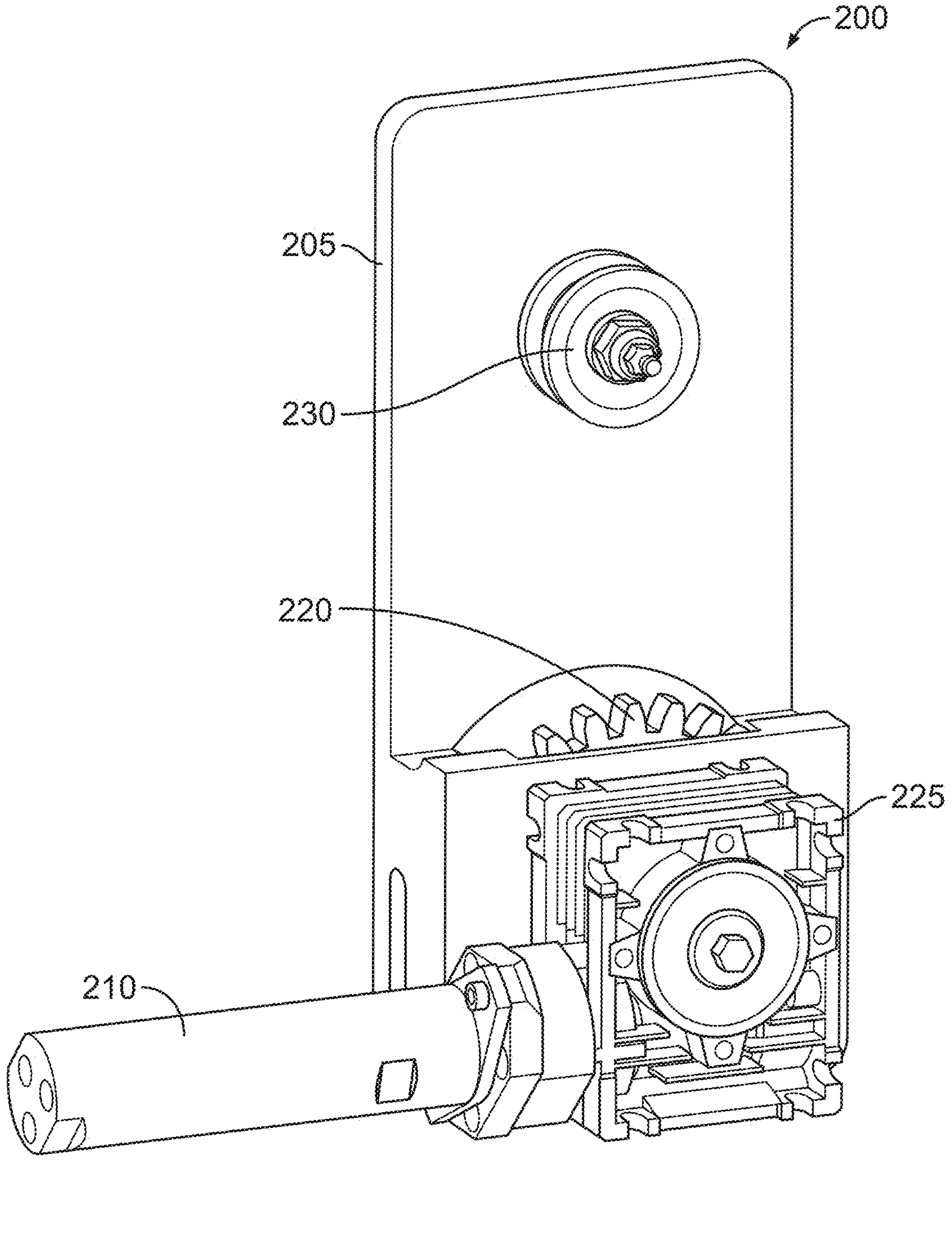
FIG. 4 illustrates an isometric view of the drive unit illustrated in FIG. 2.

Referring now to FIG. 4, illustrated is an isometric view of the drive unit 200 illustrated in FIG. 2. The drive unit 200 includes a base plate 205 on which the tensioner roller 230 and a gearbox 225 driven by motor 210 are mounted. The drive unit 200 is mounted around the drive rail 115 as described above, wherein the drive gear 220 engages the drive rail 115 to move along the rail 115 as needed.

Figure 5:
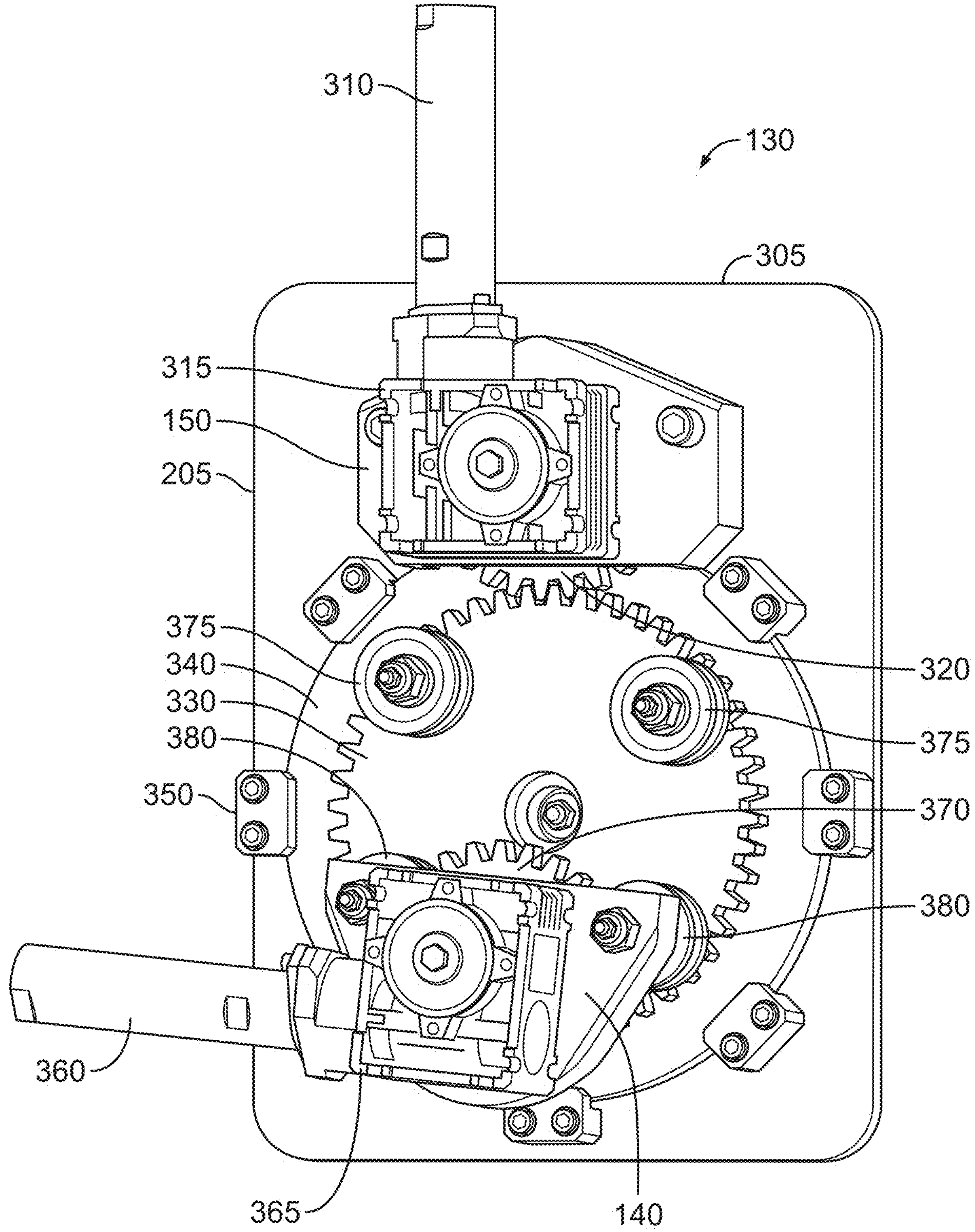
FIG. 5 illustrates an isometric view of the side of the carriage of FIG. 1 having the feed assembly and the rotation assembly, but with the cleaning arm removed.

FIG. 5 illustrates an isometric view of the side of the carriage 130 having the feed assembly 140 and the rotation assembly 150, but with the cleaning arm 145 removed. A carriage plate 305 is used to carry the feed assembly 140 and rotation assembly 150, as well as the retention brackets 350 used to hold the rotation plate 340 against the carriage plate 305. The rotation assembly drive gear 320 is driven by motor 310 through a gearbox 315. The drive gear 320 rotates the rotation gear 330, which is mounted on the rotation plate 340, in order to rotate the position of the cleaning arm 145, as described above.

The feed assembly idler rollers 375 are also mounted to the rotation gear 320, as is the feed assembly 140. The feed assembly 140 includes a pair of feed rollers 380 positioned on each side of the feed gear 370, which cooperate with idler rollers 375 to hold the vertical position of the cleaning arm 145 when the feed assembly 140 translates the cleaning arm 145 towards and away from a part to be cleaned. The feed gear 370 is powered by motor 360 through a feed assembly gearbox 365. As with all motors in a system as disclosed herein, the motor 360 may be an electric, pneumatic, or any other type of motor.

Figure 6A:
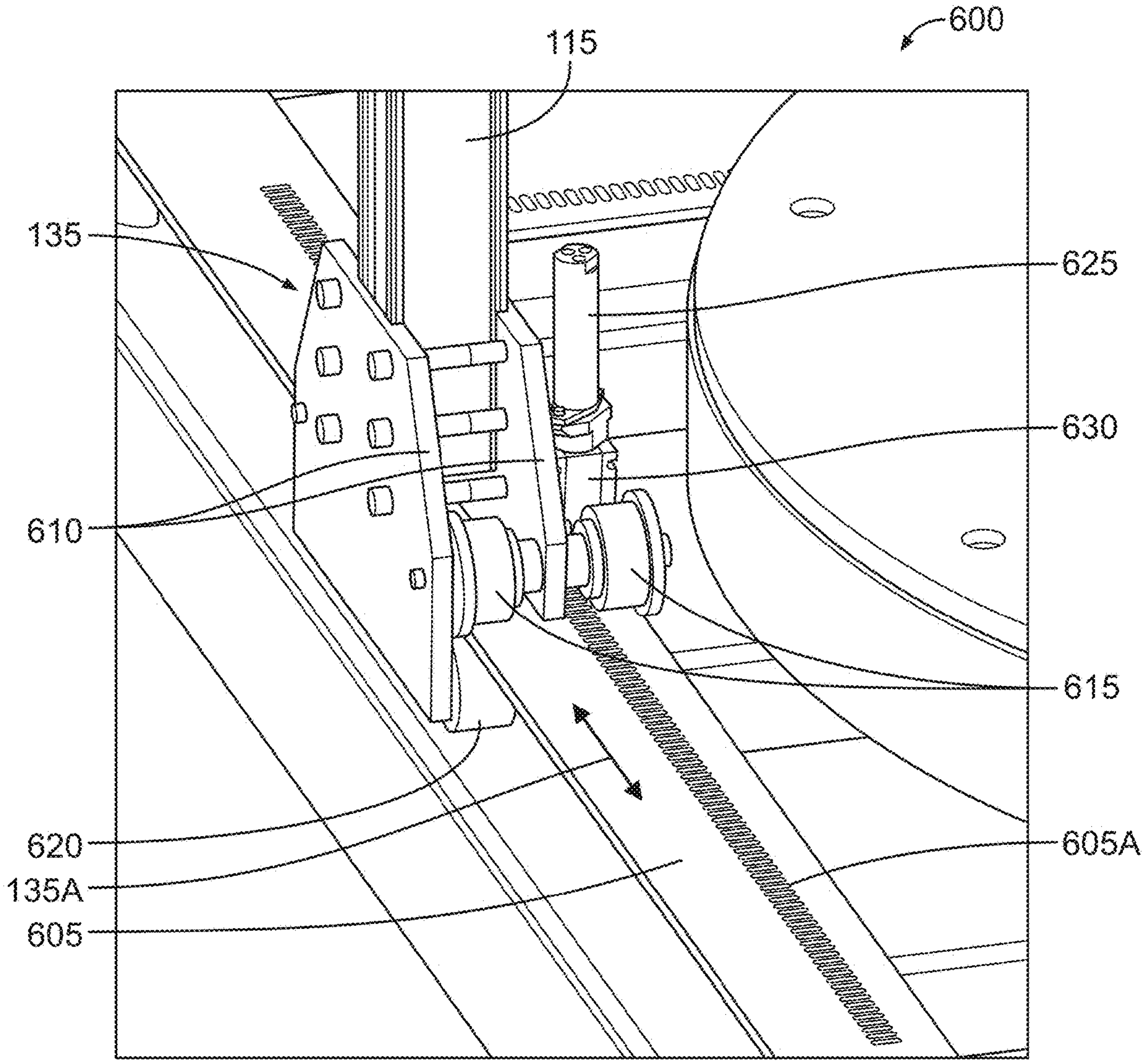
FIG. 6A illustrates a closeup isometric view of one of the base drive assemblies of the cleaning system in FIG. 1.

Turning now to FIG. 6A, illustrated is a closeup isometric view 600 of one of the base drive assemblies 135 introduced in FIG. 1. One base drive assembly 135 is positioned at each of the two ends of the drive rail 115 for simultaneous movement of the entire drive rail 115 along the Y-axis (arrow 135A). Each of the base drive assemblies 135 are attached to and configured to move back and forth on respective base rails 605. Each of the base rails 605 includes notches or similar teeth or grooves 605A formed on top surfaces thereof, and which the base drive assemblies 135 engage to provide their movement.

Each base drive assembly 135 is comprised of a pair of base drive plates 610 that are clamped one to the other around each corresponding end of the drive rail 115. Each base drive assembly 135 includes upper rollers 615 for rolling along the top surface of the base rail 605, as well as lower rollers 620 for rolling along the bottom surface of the base rail 605. The spacing between the upper roller 615 and lower rollers 620 may be selected such that a clamping fit between the two sets of rollers is provided around the upper portion of the base rail 605. In some embodiments, either or both sets of rollers may be adjustable so as to provide an adjustment to the clamping force provided between the rollers around the upper portion of the base rail 605. To provide the driving force to the base drive assemblies 135 is a motor 625 providing a driving force via a base drive gearbox 630.

Figure 6B:
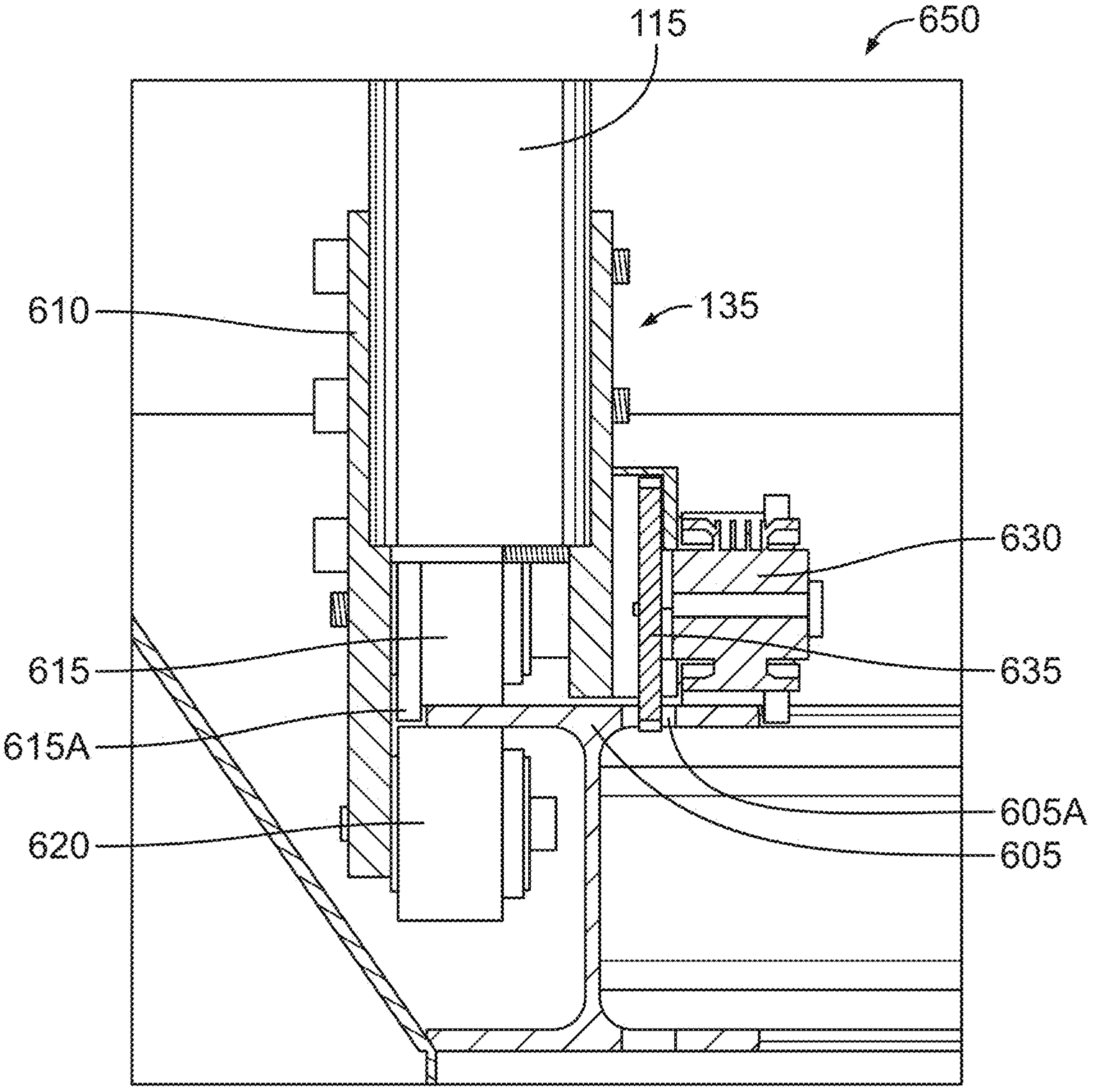
FIG. 6B illustrates a closeup front view of the base assembly illustrated in FIG. 6A.

Looking now at FIG. 6B, illustrated is a closeup front view 650 of the base assembly 135 illustrated in FIG. 6A. In this view, the right-side upper roller 615 is removed to reveal the base drive gear 635. The base drive gear 635 is driven by the motor via the gearbox 630, and includes teeth or other engage feature or features that engage the notches or slots 605A of the base rail 605. In this embodiment, the base drive gear 635 comprises teeth that engage within the notches 605A, while in other embodiments the drive gear 635 may instead comprise a friction surface configures to engage a top surface of the base rail 605. Also in this illustrated embodiment, the upper rollers 615 are flange rollers having a flange 615A configured to engage an outer edge of the base rail 605 to prevent lateral movement of the base drive assembly 135 when it is moved back and forth along the base rail 605. In some embodiments, both the upper rollers 615 and the lower rollers 620 are flange rollers, while in other embodiments only the lower rollers 620 are flange rollers.

Advantageously, in addition to providing movement of the cleaning arm 145 along the Y-axis for cleaning a part, the base drive assemblies 135 may be used to eliminate over-head interference caused by the drive rail 115 and cleaning arm 145, as well as hoses and other accessories connected to these components for use in cleaning parts, by moving the drive rail 115 and other components out of the way of parts to be cleaned for loading and unloading of parts onto the base. For their synchronized movement, the base drive assemblies 135 may be driven simultaneously using encod-ers or other similar devices to provide their synchronized movement.

Figure 7:
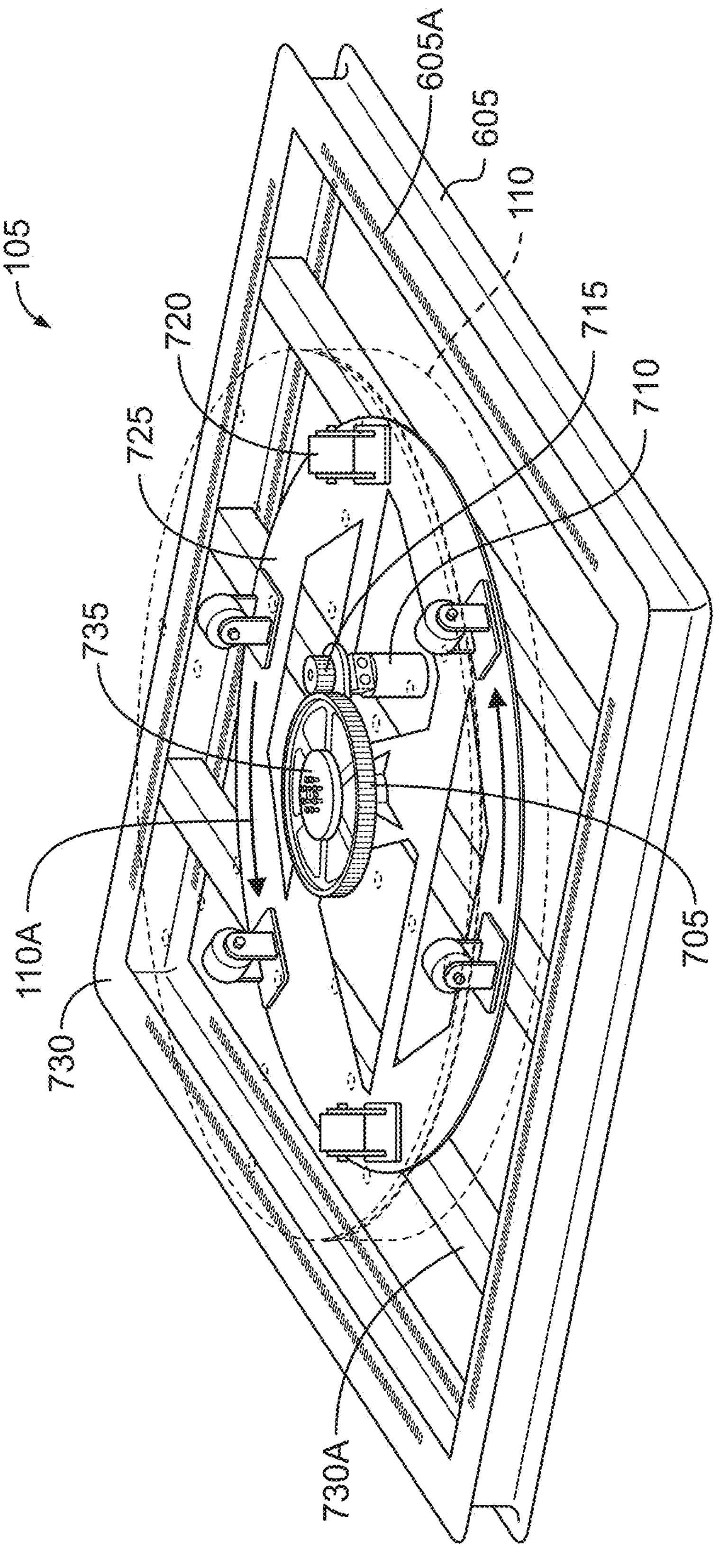
FIG. 7 illustrates an isometric view of the base of the cleaning system in FIG. 1.
Figure 7A:
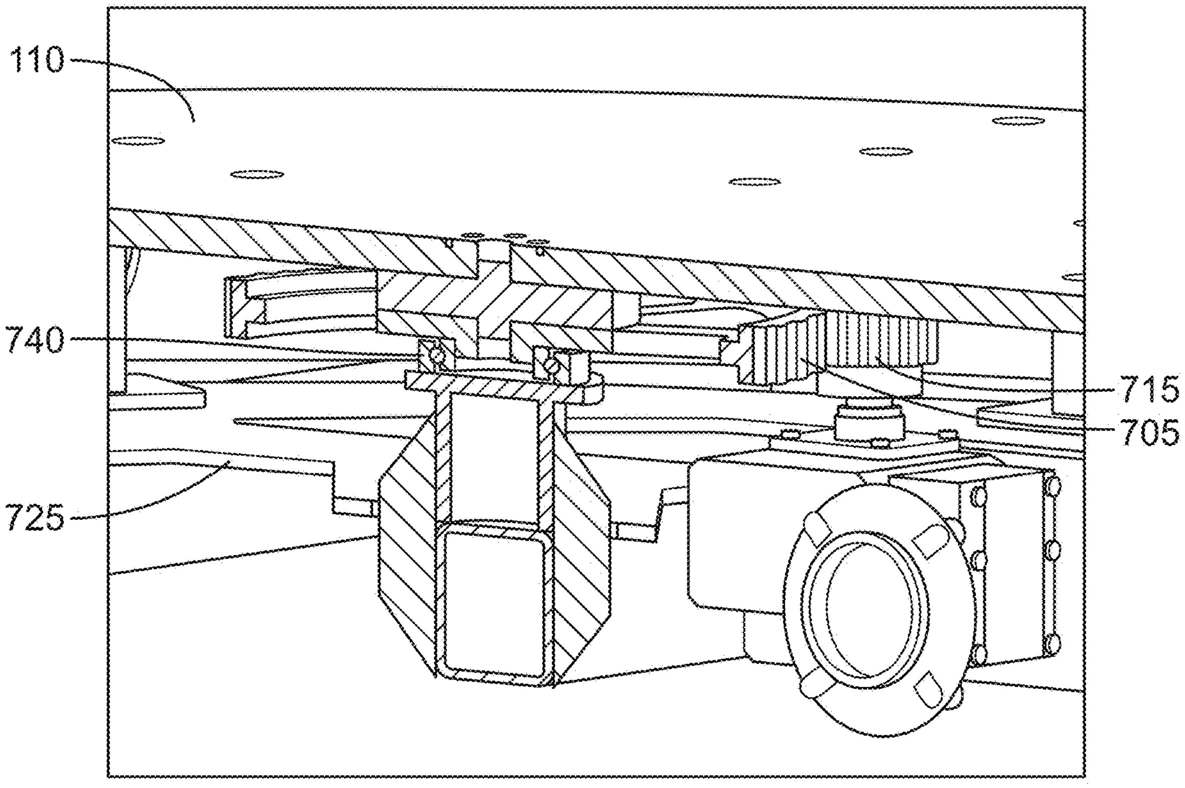
FIG. 7A illustrates a close up, cross-sectional view of a center portion of the turntable illustrated in FIG. 7.

Turning now to FIG. 7, illustrated is an isometric view of the base 105 introduced in FIG. 1. In this view, the turntable 110 is shown as partially transparent in order to shown the components underneath it. As discussed above, the turntable 110 is configured to rotate about arrows 110A from a central pivot point where a turntable rotation gear 705 is mounted at the center of the turntable 110. A turntable bearing 740 is used to support the rotation gear 705 and turntable 110, providing a fixed centerline of rotation for proper gear engagement and positional control of the turntable 110. A drive motor 710 may be used to turn the rotation gear 705 through a pinion gear on the motor 710 and spur gear reduction 715, which may or may not be driven through a gearbox (not included in this embodiment). Looking briefly at FIG. 7A, illustrated is a close up, cross-sectional view of a center portion of the turntable 110 illustrated in FIG. 7.

Turning back to FIG. 7, as before, the motor 710 may be electric, pneumatic, or even a hydraulic drive system may be employed to provide the rotational movement of the turn-table 110, as well as variable speeds of rotation as needed. For example, the turntable 110 may be rotated to align a part to be clean at a specific position relative to a positioning of the cleaning nozzle, or the turntable 110 may be rotated at one or more speeds while the part thereon is sprayed by the cleaning nozzle. Likewise, the nozzle 125 may be held stationary during certain times and at certain positions during the cleaning cycle, while at other times the nozzle is continuously moved while spraying a part. Thus, one or both of the nozzle 125 and turntable 110 may be moving during a portion or all of a cleaning cycle, or one or both may be stationary during a portion or all of a cleaning cycle.

The rotary table 110 in this embodiment rests on a plurality of support casters 720, which provide support for the cleaning of heavy parts on the turntable 110. More specifically, as the motor 710 and gears 705, 715 cause the turntable 110 to rotate, most of the weight of and on the turntable 110 is distributed onto the plurality of casters 720. The casters 720 may be mounted on a roller ring 725 that rotates about the same central axis as the turntable 110. The roller ring 725 controls positioning of the casters 720 in relation to the center of rotation, and permits synchronized movement of the casters 720 as the turntable 110 rotates on them. In some embodiments, the gears 705, 715 instead rotate the roller ring 725, which in turn rotates the turntable 110 affixed to the roller ring 725. Of course, other designs and configurations for rotating the rotary turntable 110 may also be incorporated in a cleaning system as disclosed herein.

A frame 730 is used to provide the support for the base 105, along with one or more crossmembers 730A. In this illustrated embodiment, a central crossmember 730A pro-vides support for a central axle 735 about which the rotation gear 705 and roller ring 725 are rotated by the motor 710. The frame 730 is made from “H” or “I” beams 605 to simultaneously provide a rigid structure for supporting the other components of the cleaning system 100, as well as a top surface for the notches or slots 605A along which the base drive assemblies 135 roll. In some embodiments such that one illustrated in FIG. 7, slots 605A are provided on all beams 605 forming the frame 730 so that the base drive assemblies 135 may be installed on either opposing pairs of beams 605. In other embodiments, only one pair of opposing beams 605 includes the slots 605A such that the base drive assemblies 135 can only be installed on one set of beams 605. In still other embodiments, more than just four beams 605 may be employed to form the base 730, such as employing six or more beams 605; however, at least one pair of parallel beams 730 is advantageous to include so that the base drive assemblies 135 may simultaneously move in the manner described above.

Figure 8:
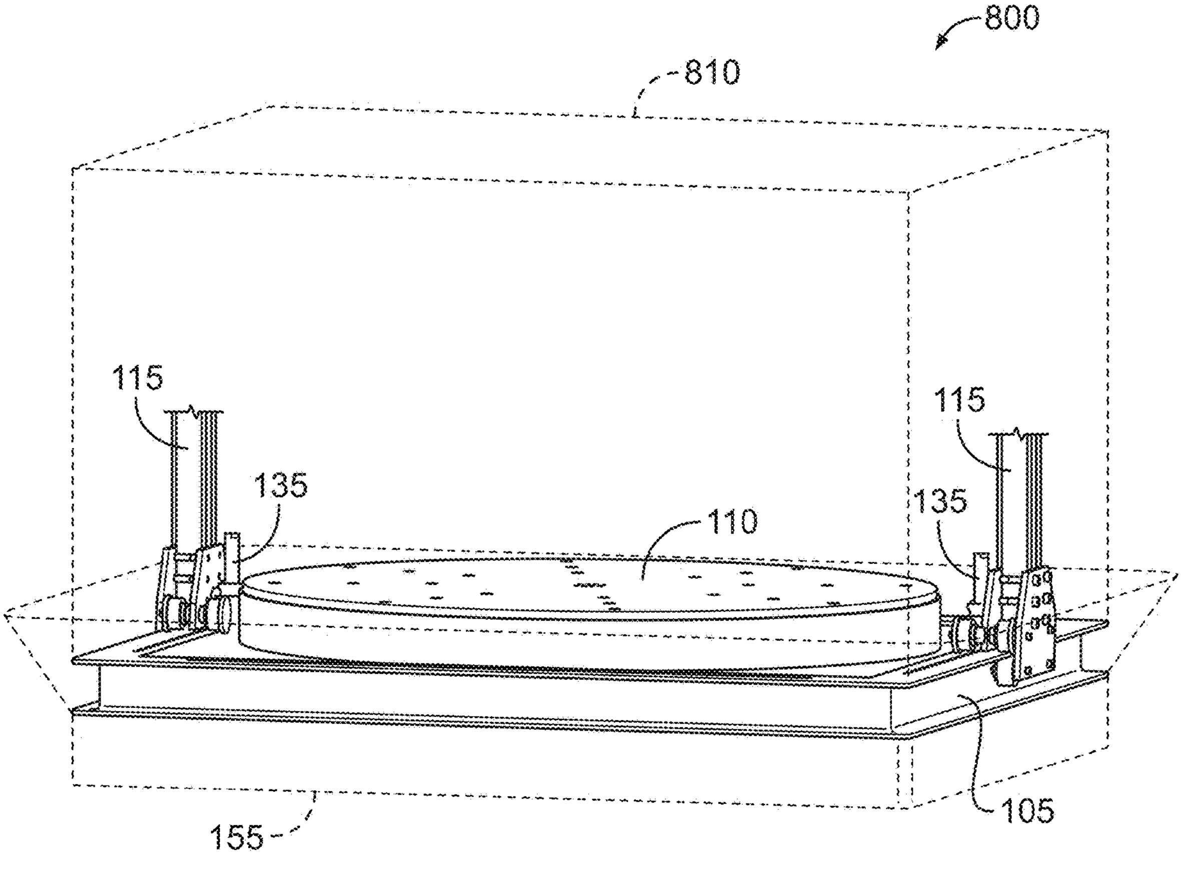
FIG. 8 illustrates an isometric view of a lower portion of the cleaning system illustrated in FIG. 1.

Turning finally to FIG. 8, illustrated is an isometric view of a lower portion 800 of the cleaning system 100 illustrated in FIG. 1. In this illustration, the base 105 is shown positioned within the basin 155 introduced above. In some embodiments, the basin 155 may be formed on and around the frame 730 of the base 105, and in other embodiments the basin 155 may be removable from the base 105. By being easily removable from the base 105, the basin 155 may be more easily emptied of debris and cleaned after use of the cleaning system 100.

The basin 155 captures cleaning fluid/effluent used by the cleaning system 100 to clean parts placed on the turntable 110. Additionally, walls 810 may be included extending upwards from the base 105 and connected to one another to assist in retaining effluent or other fluids within the enclo-sure of the cleaning system. In exemplary embodiments, such walls may be transparent or semitransparent, such as acrylic or polycarbonate, to permit viewing of the part being cleaned during use of the system 100. While the walls 810 are illustrated in FIG. 8 as extending from the frame 130 of the base 105, in other embodiments the walls 810 may be affixed to and extend from upper edges of the basin 155.

As fluid is collected by the basin 155 during use of the cleaning system 100, such collected fluid may be directed to a drain formed on the bottom of the basin 155. A screen or filter may be included with the drain so that the effluent may be drained, while debris removed from the parts being cleaned is retained in the basin 155 for later removal. In some embodiments, collected fluid can be recycled for reuse by the cleaning system 100. In such embodiments, the collected effluent may be processed through a filtering system (not illustrated) such that the recycled fluid does not inadvertently clog other components of the cleaning system 100.

With an arc-based cleaning system 100 designed and constructed in accordance with the disclosed principles, part having unusual shapes and hard to reach places can be easily cleaned. Not only does the turntable 110 rotate the parts in either direction, but the carriage 130 carrying the cleaning arm 145 and nozzle 125 is configured to travel, in both directions, along the arc-shaped drive rail 115. As discussed in detail above, the carriage 130 includes rollers 240 with the drive unit 200 to permit the carriage 130 to smoothly translate around curved portions of the drive rail 115. The degree of radius of any curved portions of the drive rail 115 can determine the amount of movement provided for the drive unit idler rollers 240.

In advantageous embodiments of a cleaning system as disclosed herein, the drive rail may be modular such that it can be built with a curvature that best permits the cleaning arm and nozzle to be positioned in order to clean every portion of part. A cleaning system may be provided with multiple straight sections of one or more lengths, along with curved sections having one or more radii of curvature. In such embodiments, users may assemble some or all of the straight and curved sections as needed based on the shape of the part(s) to be cleaned. Similarly, in some embodiments, the frame of the base of the cleaning system may also be provided in modular sections, wherein the size of the base can be selected based on the part(s) to be cleaned. Such modular construction allows users to not only build the cleaning system with a drive rail that assists in moving the nozzle to reach and clean every area of the parts to be cleaned, but also permits the system to be scaled for the overall size of the parts to be cleaned. In such embodiments, different size turntables may also be provided as the cleaning system is scaled for various part sizes.

Figure 9A:
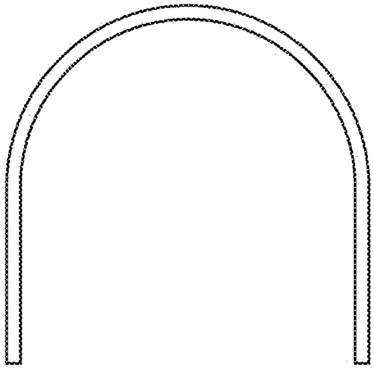
FIGS. 9A-9G illustrate various embodiments of modular drive rails for use in a cleaning system according to the disclosed principles.
Figure 9B:
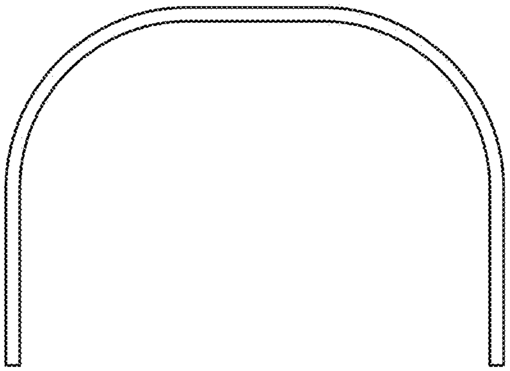
Figure 9C:
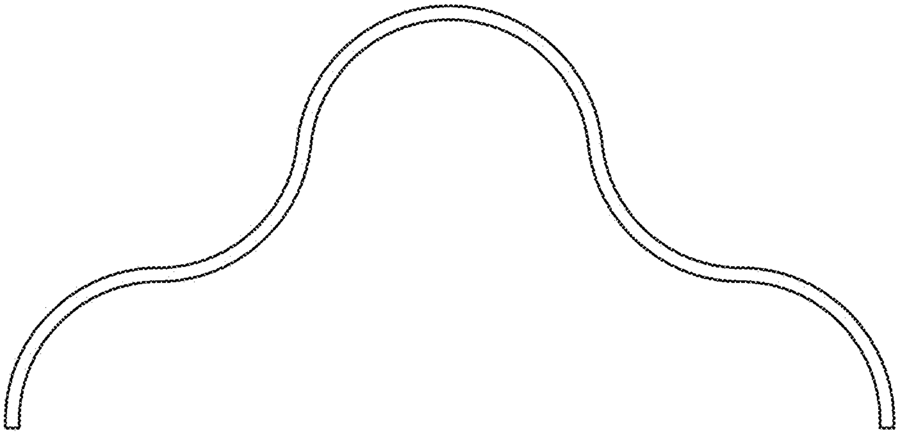
Figure 9D:
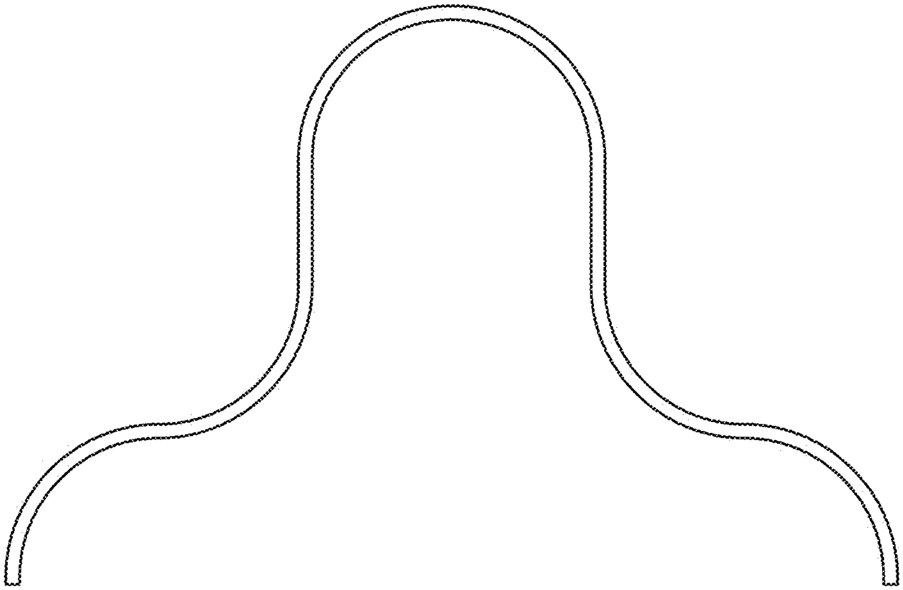
Figure 9E:
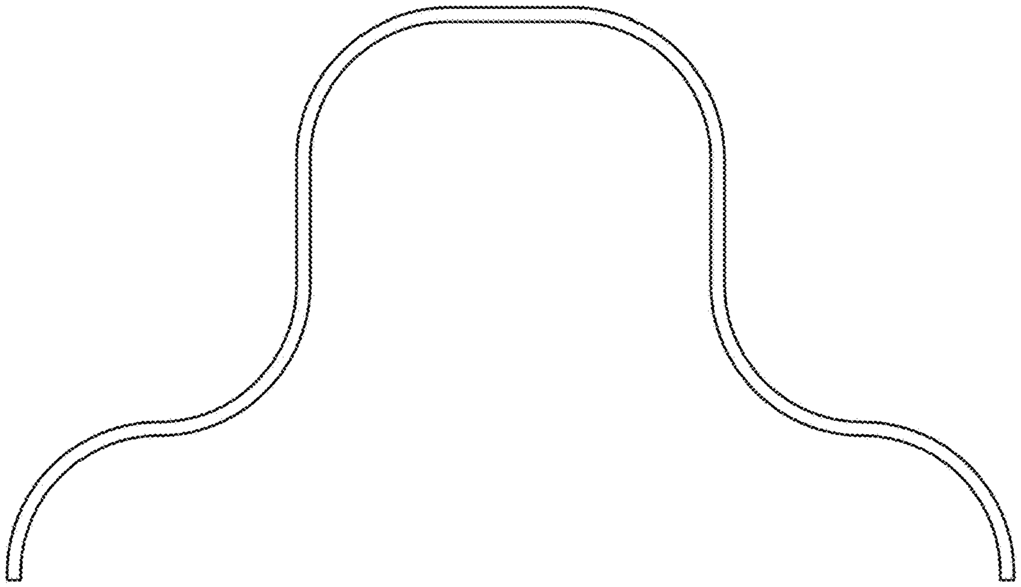
Figure 9F:
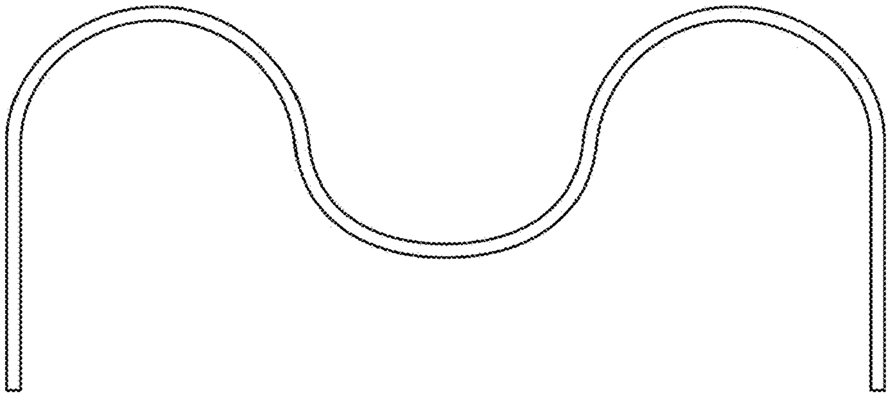
Figure 9G:
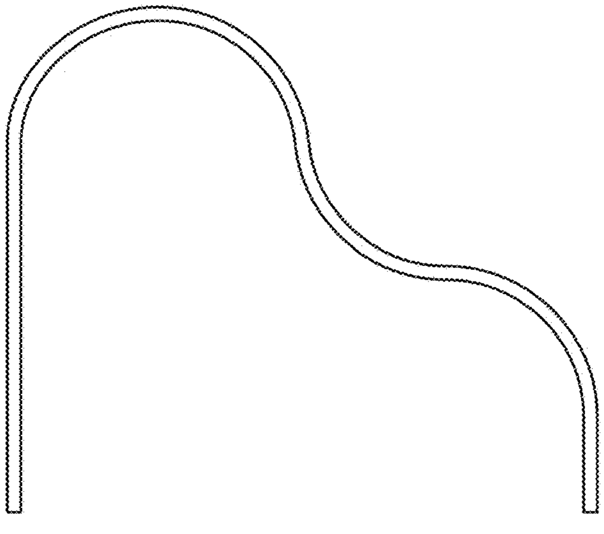

In some embodiments, the drive rail is provided in a single arc having straight lower portions on both ends of the drive rail coupled to the base drive assemblies, as illustrated in FIG. 9A. In other embodiments, the drive rail may be provided in a single arc having a straight portion between the upward and downward bends, as illustrated in FIG. 9B. In some embodiments, the drive rail may have a central arc with outward and inward curved sections, as illustrated in FIG. 9C. In other embodiments, the drive rail may have a raised central arc along with the outward and inward curved sections, as illustrated in FIG. 9D. Similar to the embodiment in FIG. 9D, the drive rail may also include a straight section in the central arc, as illustrated in FIG. 9E. In some embodiments, the drive rail may have double arcs with a downward arc between the double upward arcs, as illustrated in FIG. 9F. And in other embodiments, the drive rail may have an offset upper arc, as illustrated in FIG. 9G. Of course, with such a module construction, an arc-based cleaning system in accordance with the disclosed principles can have any other advantageous shape and curvature for the drive rail, and such additional drive rail formations fall within the spirit and scope of the present disclosure.

As disclosed herein, a cleaning system designed and constructed in accordance with the disclosed principles provides a powered carriage driving along an arc-based track to position the cleaning head relative to the target. The arc-based track is comprised of modular sections having either a straight or curved shape, which can thereby be assembled to provide a multitude of curvilinear shapes to the rail depending on the shape of the part to be cleaned. By permitting building the rail or track into a multitude of various shapes, the cleaning system can provide the cleaning head into any positioned needed to reach and thereby clean any hard-to-reach nook or crevice of an unusually shaped part.

To further assist in doing so, a cleaning system as disclosed herein comprises at least 4-axis movement. A first axis (X-axis) of movement is provided by a pair of base drive assemblies coupled to lower ends of the arc-based track or rail, and configured to translate the entire track laterally. A second axis (Y-axis) is provided by the powered carriage configured to drive along the arc-based rail in both directions, and along both straight and curved sections of the custom-assembled rail. A third axis (Z-axis) is provided by a feed assembly holding a cleaning arm having the cleaning nozzle at one end, wherein the feed assembly is configured to move the cleaning arm, and thus the nozzle, towards and away from the part to be cleaned as needed. This permits the cleaning nozzle or head to be positioned relative to the powered carriage to control waterjet standoff distance. A fourth axis (pitch) is provided by a rotational assembly mounted on the powered carriage and carrying the feed assembly, wherein the rotational assembly is configured to rotate the feed assembly, and thus the longitudinal axis of the cleaning arm. A fifth axis of movement is provided by a powered turntable positioned under the arc-based rail, and configured to rotate the part to be cleaned in either direction relative to the cleaning nozzle. Also, an optional sixth axis of movement (roll) may be provided by a roll assembly further mounted on the rotational assembly, and configured to provide a roll movement of the cleaning arm, and thus the cleaning nozzle, in either direction.

For powering the various axes of movement of a cleaning system as disclosed herein, each of the components providing an axis of movement discussed above may be provided via a motor-based drive unit, which may by electric, pneumatic, hydraulic, or a power-based drive system. Gearing may be provided via spur gear reduction or via gearboxes, such as planetary gearboxes. Sensors may be employed to automatically control standoff distance of the cleaning nozzle or other drive components of the cleaning system to prevent cleaning head collision with unusual part geometries.

Control of the various axes of movement and thus the positioning of the cleaning nozzle throughout the cleaning of a part may be provided via remote control operated by a user. Such remote control may be via tethered or wireless console. Remote operation of the cleaning system permits a user to be located a safe distance from the cleaning system during use.

In some embodiments, a user may program the optimum positioning of the cleaning nozzle, and rotation of the turntable, needed to clean a part prior to beginning the cleaning process. In such embodiments, the user can employ a control console to position the cleaning nozzle and turntable in all needed locations relative to the shape of the part to be cleaned, while programming each such location/position into an automated drive system. For example, a user may operate the console or controller to position the cleaning head into a desired position, as well as rotation of turntable as needed, using the various axes of movement, and then store those positions in the drive system computer along with the amount of time the cleaning head and/or turntable are to remain at respective positions during a cleaning cycle. In some cases, the turntable may be programmed to rotate in either direction and at variable speeds, if needed, while the cleaning head is held in a desired position. The user may then move the cleaning head to the next needed position, rotate the turntable or program a rotational speed of the turntable, and then store those positions/speeds along with the time the cleaning head and/or turntable is to be held at this second position. The user can then continue doing so until the user is satisfied that the spray from the cleaning nozzle will reach each area of the part to be cleaned, and for a period of time sufficient to clean each area. Once all of the locations of the nozzle, as well as the rotational positions and/or speeds of the turntable, are programmed into the drive system, as well as the time at each location, a cleaning cycle can be automated by the programmed drive system where the nozzle is driven to each programmed location, stopped for the duration programed by the user if needed, and the turntable is rotated to a desired stationary position or is rotated at a desired speed while the cleaning head is at a programmed position.

In other embodiments, one or more cameras, sensors, and associated processing equipment may be used to map the optimum locations of the cleaning nozzle and rotational position or constant movement (and at a desired speed) of the turntable via the various axes of movement needed to clean all areas of a part, as well as the duration the cleaning head is held at each mapped location, if needed, in order to properly clean all desired areas of a part. In such embodiments, the mapping components can analyze a part to be cleaned once it is placed on the turntable, and then determine the movement along the various axes described above to allow the cleaning nozzle to reach all areas of the part during cleaning and/or the optimal rotation of the turntable and whether it should be stationary at certain time during the cleaning cycle or continuously rotated at a predetermined speed. Such automated cleaning is especially beneficial when a large number of the same shaped parts are to be cleaning consecutively, since only an initial mapping of part shape is needed. In some embodiments, the cameras/sensors are located on the cleaning arm and/or cleaning nozzle, while in other embodiments they are located on other components of the cleaning system or simply positioned near and around the cleaning system. In some embodiments, camera and sensor locations can be provided in both manners.

While this disclosure has been particularly shown and described with reference to preferred embodiments, it will be understood by those skilled in the pertinent field art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto, as permitted by applicable law. Moreover, any combination of the above-described elements in all possible variations thereof is encompassed by the disclosure unless otherwise indicated herein or otherwise clearly contradicted by context.

Also, while various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus, the following claims are hereby incorporated into the Detailed Description, with each claim standing on its own as a separate embodiment.

Any and all publications, patents, and patent applications cited in this disclosure are herein incorporated by reference as if each were specifically and individually indicated to be incorporated by reference and set forth in its entirety herein.

What is claimed is:

1. A method of cleaning a part, the method comprising:

forming a drive rail starting at a first end and ending at a second end, and the first and second ends supported on a base;

bidirectionally translating the drive rail across the base along a first axis of movement defined by the base;

bidirectionally driving a carriage on the drive rail along a second axis of movement defined by the drive rail;

moving a cleaning arm having a cleaning nozzle at one end towards and away from a part to be cleaned along a third axis of movement defined by a length of the cleaning arm, the cleaning arm mounted on the carriage;

bidirectionally rotating the cleaning arm along a fourth axis of movement orthogonal to the second axis of movement;

bidirectionally rotating the part to be cleaned along a fifth axis of movement using a turntable mounted on the base, the fifth axis of movement defined by an axis of rotation of the turntable; and expelling effluent from the nozzle onto the part to be cleaned.

2. A method according to claim 1, wherein forming the drive rail comprises forming the drive rail using a plurality of connectable modular sections, each section having either a straight or curved shape.

3. A method according to claim 1, further comprising rolling the cleaning arm and the cleaning nozzle bidirectionally along a rotational sixth axis of movement rotating about the third axis of movement.

4. A method according to claim 1, wherein bidirectionally translating the drive rail across the base along the first axis of movement further comprises:

bidirectionally translating the drive rail using powered base assemblies controlled by an automated drive system and a user-operated remote control.

5. A method according to claim 1, further comprising:

programming an automated drive system by using a remote control to position the nozzle in a plurality of locations relative to the part to be cleaned and to rotate the turntable relative to the nozzle, and storing each of the plurality of locations and turntable rotation such that the automated drive system automatically positions the nozzle in the stored locations and rotates the turntable during cleaning of the part.

6. A method according to claim 1, further comprising:

mapping, using one or more of cameras and sensors, an outer surface of the part to be cleaned, and automatically driving, using an automated drive system, one or more of powered base assemblies to bidirectionally translate the drive rail, the carriage on the drive rail, a powered feed assembly to move the cleaning arm, a powered rotation assembly to bidirectionally rotate the cleaning arm, and the turntable to bidirectionally rotate the part to be cleaned, wherein cleaning the part comprises expelling the effluent from the nozzle onto the mapped outer surface.

7. A method according to claim 1, further comprising positioning a basin under and at least partially around the base, the basin sized to capture the expelled effluent and debris or contaminants from the part to be cleaned.

8. A method according to claim 1, wherein bidirectionally driving the carriage on the drive rail along a second axis of movement further comprises:

bidirectionally driving the carriage on the drive rail along the second axis of movement using an automated drive system and a user-operated remote control.

9. A method according to claim 1, wherein moving the cleaning arm having the cleaning nozzle at one end towards and away from the part to be cleaned along the third axis of movement further comprises:

moving the cleaning arm using a powered feed assembly controlled by an automated drive system and a user-operated remote control.

10. A method according to claim 1, wherein bidirectionally rotating the cleaning arm along the fourth axis of movement further comprises:

bidirectionally rotating the cleaning arm using a powered rotation assembly controlled by an automated drive system and a user-operated remote control.

11. A method according to claim 1, wherein bidirectionally rotating the part to be cleaned along the fifth axis of movement using the turntable mounted on the base further comprises:

controlling the turntable using an automated drive system and a user-operated remote control.

* * * * *